US009900096B2

(12) United States Patent
Hajimiri et al.

(10) Patent No.: US 9,900,096 B2
(45) Date of Patent: *Feb. 20, 2018

(54) OPTICALLY ASSISTED ELECTRICAL FILTERING AND PROCESSING

(71) Applicant: California Institute of Technology, Pasadena, CA (US)

(72) Inventors: Seyed Ali Hajimiri, La Canada, CA (US); Firooz Aflatouni, Philadelphia, PA (US); Behrooz Abiri, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 468 days.

This patent is subject to a terminal disclaimer.

(21) Appl. No.: 14/489,354

(22) Filed: Sep. 17, 2014

(65) Prior Publication Data
US 2017/0063460 A1   Mar. 2, 2017

Related U.S. Application Data

(60) Provisional application No. 61/878,746, filed on Sep. 17, 2013.

(51) Int. Cl.
*H04B 10/00* (2013.01)
*H04B 10/25* (2013.01)
*H04B 10/516* (2013.01)

(52) U.S. Cl.
CPC ....... *H04B 10/2504* (2013.01); *H04B 10/516* (2013.01)

(58) Field of Classification Search
CPC ........ H04B 10/63; H04B 10/2569; G02F 7/00
(Continued)

(56) References Cited

U.S. PATENT DOCUMENTS

| 6,700,517 B1* | 3/2004 | Kellar | G02F 7/00 |
| | | | 341/126 |
| 7,496,298 B2* | 2/2009 | Chen | H04B 10/2513 |
| | | | 398/149 |

(Continued)

OTHER PUBLICATIONS

U.S. Appl. No. 14/489,393, Non-Final Office Action dated Sep. 23, 2015.
(Continued)

*Primary Examiner* — Don N Vo
(74) *Attorney, Agent, or Firm* — Alston & Bird LLP

(57) ABSTRACT

An electro-optical circuit, includes in part, a modulator, a signal splitter, N signal paths each having one or more signal processing components, N photo-diodes and a signal combiner. The modulator modulates an optical signal using an electrical input signal. The splitter splits the modulated optical signal into N optical signals each delivered to a different one of the N paths for processing by the associated signal processing component(s). Each photo-diode converts an optical signal it receives from its associated optical signal processing component(s) to a current signal. The signal combiner combines the N current signals it receives from the N photo-diodes to generate an output current signal. The signal processing component(s) may be a variable optical delay component, a variable optical gain/attenuation component, or both thus enabling the output current signal to represent a filtered version of the electrical input signal.

30 Claims, 3 Drawing Sheets

(58) Field of Classification Search
USPC .......................................................... 398/116
See application file for complete search history.

(56) References Cited

U.S. PATENT DOCUMENTS

| | | |
|---|---|---|
| 2001/0024315 A1 | 9/2001 | Cisternino et al. |
| 2003/0147116 A1 | 8/2003 | Shpantzer et al. |
| 2005/0013612 A1 | 1/2005 | Yap |
| 2006/0239695 A1* | 10/2006 | Sayyah ................ G02F 1/0121 398/161 |
| 2010/0080570 A1 | 4/2010 | Conroy et al. |
| 2012/0155880 A1 | 6/2012 | Nishimoto et al. |
| 2012/0213531 A1* | 8/2012 | Nazarathy ............. H03M 1/145 398/202 |
| 2015/0104191 A1 | 4/2015 | Hajimiri et al. |

OTHER PUBLICATIONS

U.S. Appl. No. 14/489,393, Response to Non-Final Office Action filed Mar. 21, 2016.
U.S. Appl. No. 14/489,393, Final Office Action dated Apr. 8, 2016.
U.S. Appl. No. 14/489,393, Response to Final Office Action filed Oct. 6, 2016.
U.S. Appl. No. 14/489,393, Non-Final Office Action dated Oct. 20, 2016.
Yao, et al., "Optoelectronic microwave oscillator," *J. Opt. Soc. Amer. B,* 13(8):1725-1735, (1996).
Aflatouni, et al., "Design Methodology and Architectures to Reduce the Semiconductor Laser Phase Noise Using Electrical Feedforward Schemes," *IEEE Transactions on Microwave Theory and Techniques,* 58(11):3290-3303, (2010).

* cited by examiner

OPTICALLY ASSISTED ELECTRICAL FILTERING AND PROCESSING

CROSS-REFERENCES TO RELATED APPLICATIONS

The present application claims benefit under 35 USC 119(e) of U.S. provisional application No. 61/878,746, filed Sep. 17, 2013, entitled "OPTICALLY ASSISTED ELECTRICAL FILTERING AND PROCESSING", the content of which is incorporated herein by reference in its entirety.

FIELD OF THE INVENTION

The present invention relates to electro-optical systems, and more particularly to using optical components to process and filter electronic signals.

BACKGROUND OF THE INVENTION

Electro-optical systems, also referred to as optically assisted electronics, perform certain operations in the optical domain and thus may have an enhanced overall performance. Such systems include optically realized low loss electrical delays, optically driven low phase noise oscillators, low loss interconnects, as well as mm-wave and THz signal generators. The high carrier frequency of optical signals when used in electrical systems enables electro-optical systems to have a performance that may exceed that of fully electrical systems. Furthermore, the relatively small size of some optical components, such as integrated photonic resonators, enable certain filtering operations to be performed in a smaller area compared to an equivalent fully electrical system.

In other electro-optical systems, such as low phase-noise optically-enabled mm-wave oscillators, the high optical carrier frequency enables design of high-Q electro-optical oscillators with phase noise levels approaching those of mm-wave designs with potential for relatively high tunability, and significantly lower size and power consumption. Delay lines limited by losses in the RF and mm-wave regime may be efficiently implemented in photonic integrated circuits. For example, an optical delay realized in a silicon-on-insulator (SOI) process may have over an order of magnitude less propagation loss than the same delay realized in a standard CMOS process.

BRIEF SUMMARY OF THE INVENTION

An electro-optical circuit, in accordance with one embodiment of the present invention, includes in part, a modulator, a signal splitter, N signal paths each having at least one signal processing component, N photo-diodes, and a signal combiner. The modulator is adapted to modulate an optical signal using an electrical input signal. The splitter splits the modulated optical signal into N optical signals each of which is delivered to a different one of the N paths for processing by an associated signal processing component. Each photo-diode is adapted to convert the optical signal it receives from its associated optical signal processing component to a current signal. The signal combiner combines the N current signals it receives from the N photo-diodes to generate an output current signal.

In one embodiment, each of at least a subset of the N optical signal processing components is a variable optical delay component. In one embodiment, one or more of the N optical paths further include a second optical signal processing component. In one embodiment, each of at least a subset of the second signal processing components is a variable optical gain/attenuation component. In one embodiment, the two subsets are the same. In one embodiment, each of the two subsets is a full set. In one embodiment, the variable delay component may be a waveguide, an optical switch, a p-n junction, or a ring resonator.

In one embodiment, the delays of the variable optical delay components, and the gain/attenuation values of the variable optical gain/attenuation components are selected such that the output current signal represent a filtered version of the input electrical signal. In one embodiment, the electrical input signal is a voltage signal.

An electro-optical circuit, in accordance with one embodiment of the present invention, includes in part, a pair of modulators, a splitter, a first group of N paths each including at least one signal processing component, a second group of N paths each including at least one signal processing component, a first group of N photo-diodes, a second group of N photo-diodes, and a pair of signal combiners. Each modulator modulates an optical signal using a different one of a pair of differential electrical input signals. The splitter splits the modulated optical signals into a first group of N optical signals and a second group of N optical signals. Each of the first group of N optical signals is received and processed by a different one of the optical signal processing components disposed in the first group of N paths. Each of the second group of N optical signals is received and processed by a different one of the optical signal processing components disposed in the second group of N paths. Each photo-diode of the first group of N photo-diodes is associated with and converts to a current signal the optical signal received from a different one of the optical signal processing components of the first group of N paths. Each photo-diode of the second group of N photo-diodes is associated with and converts to a current signal the optical signal received from a different one of the optical signal processing components of the second group of N paths. A first one of the combiners combines the N current signals received from the first group of N photo-diodes to generate a differentially positive output current signal. The second combiner combines the N current signals received from the second group of N photo-diodes to generate a differentially negative output current signal.

In one embodiment, a subset of the optical signal processing component disposed in the first and second groups of N paths is a variable optical delay component. In one embodiment, one or more of each of the first and second groups of N optical paths further includes a second optical signal processing component. In one embodiment, a subset of the second optical signal processing component disposed in the first and second groups of N optical paths is a variable optical gain/attenuation component. In one embodiment, the subsets are the same. In one embodiment, each of the two subsets is a full set.

In one embodiment, the variable delay component may be a waveguide, an optical switch, a p-n junction, or a ring resonator. In one embodiment, the delays of the variable optical delay components, and the gain/attenuation values of the variable optical gain/attenuation components are selected such that the differentially positive and negative output current signals represent filtered versions of the differential electrical input signals. In one embodiment, the differential electrical signals are differential voltage signals.

DETAILED DESCRIPTION OF THE INVENTION

In accordance with embodiments of the present invention, an opto-electronic circuit includes, in part, optical components such as delay lines, resonators, amplifiers/attenuators adapted to, for example, process (e.g., filter) electrical signals up-converted to optical frequencies.

Figure 1:
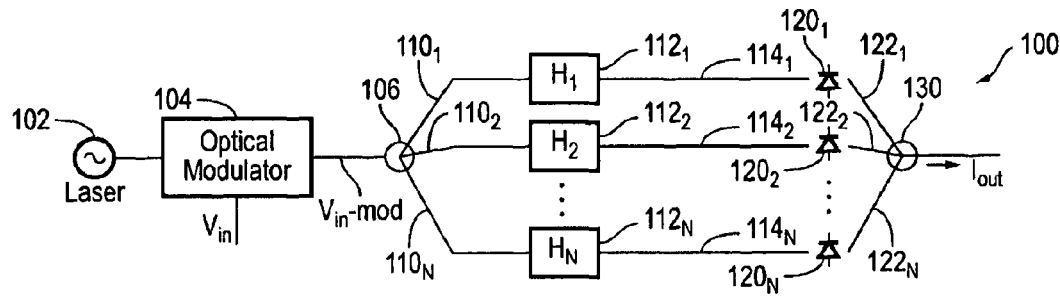
FIG. 1 is a simplified block diagram of an integrated electro-optical signal processing circuit, in accordance with one embodiment of the present invention.

FIG. 1 is a simplified block diagram of an integrated electro-optical signal processing circuit (hereinafter alternatively referred to as circuit) 100, in accordance with one embodiment of the present invention. Circuit 100 is shown as including, in part, an optical modulator 104, a signal splitter 106, a multitude of optical signal processing paths 110, a combiner 130, and a multitude of photo-diodes 120.

As shown, input voltage $V_{in}$ is used to modulate the optical signal generated by optical source 102. In one embodiment optical source 102 may be a laser. The modulated optical signal $V_{in}$_mod is split by optical signal splitter 106 into N optical signals each delivered to a different one of N optical paths $110_1$, $110_2$ ... $110_{N-1}$, $110_N$ (collectively referred to herein as optical paths 110) where N is an integer greater than one. Disposed in each optical path $110_i$, where i is an integer ranging from 1 to N, is an optical signal processing component 112, adapted to process the optical signal it receives and deliver the processed optical signal to an associated photo-diode $124_i$ disposed in that path.

In the following, for simplicity, the same reference number may be used to identify both the path through which a signal travels, as well as to the signal which travels through that path. For example, reference numeral $110_1$ may be used to refer to the path so identified in FIG. 1, or alternatively to the signal that travels through this path. Furthermore, in the following, the terms divider, splitter, coupler, or combiner are alternatively used to refer to an element adapted to split/divide a signal to generate more signals and/or couple/combine a multitude of signals to generate one or more signals. Such a component is also alternatively referred to herein as splitter/coupler. Furthermore, although the embodiments of the present invention are described with reference to photodiodes, it is understood that any device that converts an optical signal to an electrical signal may also be used; accordingly, all such devices are referred to herein as photodiodes.

As described above, each modulated optical signal $110_i$ is processed by an associated optical processing component 112, thereby to generate a processed optical signal $114_i$ that is delivered to an associated photodiode $120_i$. In response, each photodiode $120_i$ generates an electrical signal $122_i$. Combiner 130 is adapted to receive and combine currents $122_i$ to generate output signal $I_{OUT}$, which represents of a filtered version of signal $V_{in}$. Because circuit 100 uses a multitude of photodiodes 120 circuit 100 operates at a relatively high optical power despite the low power handling capability of the individual photodiodes and other optical components.

Different optical paths $110_i$ may have different optical components $112_i$. For example, optical component $112_1$ may be a delay component adapted to cause a delay of optical signal $110_1$; optical component $112_2$ may be an amplifier/attenuator component adapted to increase or decrease the amplitude of signal $110_2$; optical component $112_N$ may be a phase adjust element adapted to vary the phase of signal $110_N$. Accordingly, circuit 100 enables independent adjustment of the amplitude, phase, or delay of the signals in different paths thereby to achieve various signal processing operations, such as filtering or shaping of the input signal.

Figure 2:
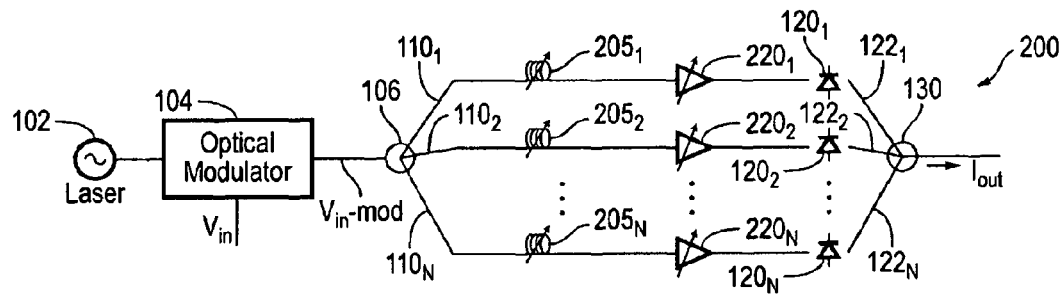
FIG. 2 is a simplified block diagram of an integrated electro-optical signal processing circuit, in accordance with one embodiment of the present invention.

FIG. 2 is a simplified block diagram of an electro-optical signal processing circuit (hereinafter alternatively referred to as circuit) 200, in accordance with one embodiment of the present invention. Circuit 200 is shown as including, in part, an optical modulator 104, a signal splitter 106, a multitude of optical signal processing paths 110 each having a delay component 205 and a variable gain/attenuator 220, a combiner 130, and a multitude of photo-diodes 120.

Input voltage $V_{in}$ is used to modulate the optical signal generated by optical source 102, which may, for example, be a laser. The modulated optical signal $V_{in}$_mod is split by signal splitter 106 into N optical signals each delivered to a different one of N optical paths $110_1$, $110_2$ ... $110_{N-1}$, $110_N$, where N is an integer greater than one. Each optical path $110_i$, where i is an integer ranging from 1 to N, is shown as including a variable delay component $205_i$ and a variable gain/attenuation component $220_i$. Each variable delay component $205_i$ is adapted to optically delay the signal $110_i$ it receives from optical splitter 106. Each variable gain/attenuation component $220_i$ is adapted to vary the gain (amplification) or attenuation level of the optical signal it receives form its associated optical delay component $205_i$. Each photodiode $120_i$ is adapted to convert to an electrical current the signal it receives from its associated variable gain/attenuation component $220_i$. Combiner 130 is adapted to receive and combine currents $122_i$ to generate output signal $I_{OUT}$ of circuit 200. By varying the delays of the variable delay components $205_i$, and by varying the gain/attenuation levels of the variable gain/attenuation components $220_i$, circuit 200 operates as a finite-impulse response (FIR) filter to filter out from signal $V_{in}$ the undesirable frequency components. Consequently, output current signal $I_{out}$ represents a current-domain filtered version of signal $V_{in}$; accordingly current signal $I_{out}$ has the desired frequency characteristics.

Figure 3:
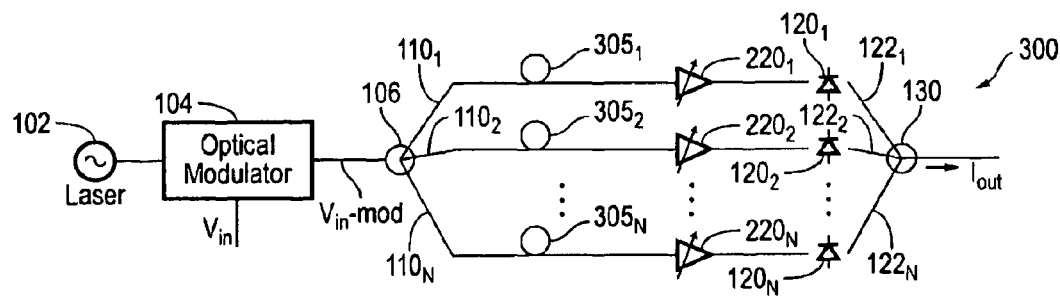
FIG. 3 is a simplified block diagram of an integrated electro-optical signal processing circuit, in accordance with one embodiment of the present invention.

It is understood that any optical component that can cause a delay in an optical signal may be used as a variable delay component $205_i$. For example, in circuit 300 shown in FIG. 3, each variable delay component $205_i$ is shown as being a ring resonator. However, it is understood that any other variable delay component such as a waveguide, a p-n junction or an optical switch may also be used. It is also understood that any optical component that can vary the gain or attenuation level of an optical signal may be used as a variable gain/attenuation component $220_i$.

Figure 4:
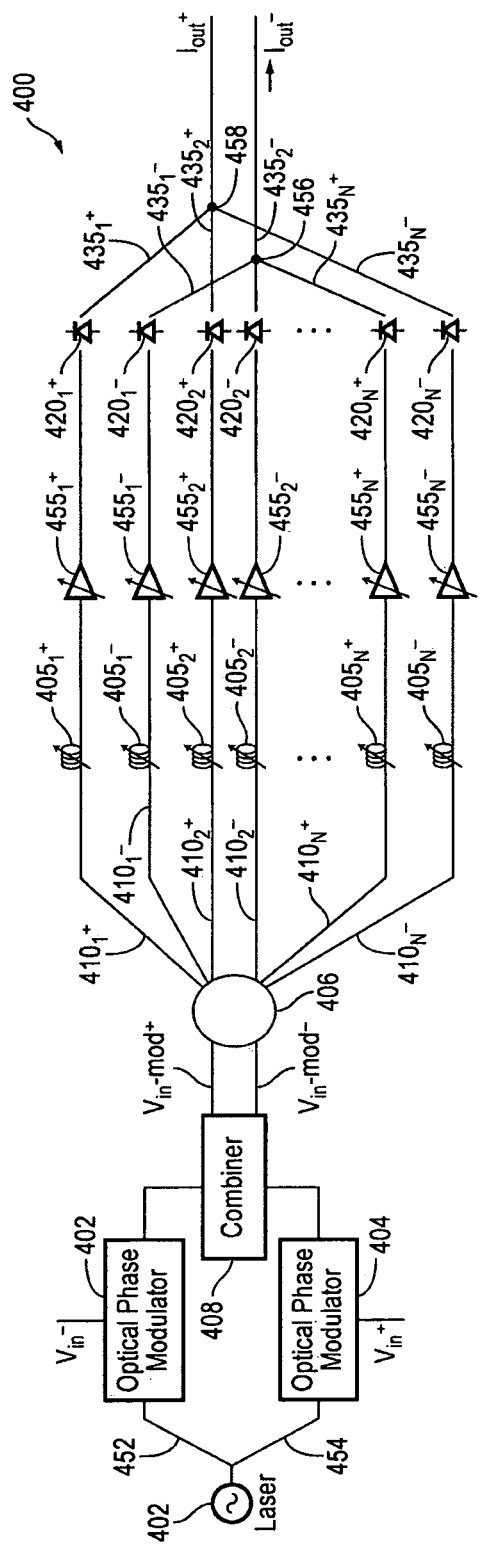
FIG. 4 is a simplified block diagram of an integrated electro-optical signal processing circuit, in accordance with one embodiment of the present invention.

FIG. 4 is a simplified block diagram of an electro-optical signal processing circuit (hereinafter alternatively referred to as circuit) 400, in accordance with another embodiment of the present invention. Circuit 400 is adapted to receive and process a pair of differential input voltage signals $V_{in}^+$, $V_{in}^-$ thereby to generate a pair of differential output current signals $I_{in}^+$, $I_{in}^-$ having characteristics defined by such processing. For example, when the processing is a filtering operation, differential signals $I_{in}^+/V_{in}^-$ represent a filtered version of differential signals $V_{in}^+/V_{in}^-$.

The optical signal generated by optical source 402, which may be a laser, is split into a pair of optical signals 452 and 454 that are respectively delivered to optical phase modulators 402 and 404. Differential input voltages $V_{in}^-$, $V_{in}^+$ are used to modulate optical signals 452 and 454 using optical phase modulators 402 and 404, respectively. The modulated optical signals are received by combiner 408 which in response delivers the optically modulated signals $V_{in\_mod}^+$ and $V_{in\_mod}^-$ to signal splitter 406. Signal splitter 406 splits each of the differential signals $V_{in\_mod}^+$ and $V_{in\_mod}^-$ into N signals, where N is an integer greater than one. Accordingly, as shown, signal $V_{in\_mod}^+$ is split into N signals $410_1^+$, $410_2^+$ ... $410_N^+$, representing differentially positive signals. Likewise, signal $V_{in\_mod}^-$ is split into N signals $410_1^-$, $410_2^-$ ... $410_N^-$, representing differentially negative signals.

Each of the 2N optical paths is shown as including a variable delay component and a variable gain/attenuator. For example, path $410_1^+$ is shown as including a variable delay component $405_1^+$ and a variable gain/attenuator $455_1^+$; path $410_1^-$ is shown as including a variable delay component $405_1^-$ and a variable gain/attenuator $455_1^-$. Likewise, path $410_N^+$ is shown as including a variable delay component $405_N^+$ and a variable gain/attenuator $455_N^+$; and path $410_N^-$ is shown as including a variable delay component $405_N^-$ and a variable gain/attenuator $455_N^-$.

Each optical delay component $405_i$ is adapted to delay the optical signal $410_i^+$ it receives in accordance with the delay value selected for optical delay component $405_i^+$. Likewise, each optical delay component $405_i^-$ is adapted to delay the optical signal $410_i^-$ it receives in accordance with the delay value selected for optical delay component $405_i^-$. Each variable gain/attenuator $455_i^+$ is adapted to vary the gain or attenuation level of the optical signal it receives from its associated optical delay component $405_i^+$ in accordance with the gain/attenuation value selected for the gain/attenuation component $455_i^-$. Similarly, each variable gain/attenuator $455_i^-$ is adapted to vary the gain or attenuation level of the optical signal it receives from its associated optical delay component $405_i^-$ in accordance with the gain/attenuation value selected for the gain/attenuation component $455_i^-$. For example, optical delay component $405_i^+$ delays optical signal $410_i^+$ in accordance with its selected delay. Likewise, variable gain/attenuator $455_1^+$ is adapted to vary the gain/attenuation level of the optical signal it receives from optical delay component $405_1^+$ in accordance with the gain or attenuation value selected for amplifier/attenuator $455_1^+$.

The optically delayed and amplified/attenuated signal in each path $410_i^+/410_i^-$ is received by an associated photo-diode $420_i^+/420_i^-$ adapted to convert the received optical signal to an electrical signal $435_i^+/435_i^-$. For example, photo-diode $420_1^+$ converts the optical signal it receives from variable gain/attenuator $455_1^+$ to an electrical signal $435_1^+$. Likewise, for example, photo-diode $420_i^-$ converts the optical signal it receives from variable gain/attenuator $455_1^-$ to an electrical signal $435_1^-$. Signal combiner/coupler 458 is adapted to combine the differentially positive current signals $435_1^+$, $435_2^+$ ... $435_N^+$ generated respectively by photo-diodes $420_1^+$, $420_2^+$ ... $420_N^+$ to generate differentially positive current signal $I_{out}^+$. In a similar manner, signal combiner/coupler 456 is adapted to combine the differentially negative current signals $435_1^-$, $435_2^-$ ... $435_N^-$ generated by photo-diodes $420_1^-$, $420_2^-$ ... $420_N^-$ to generate differentially negative current signal $I_{out}^-$.

The relationship between differential output signals $I_{out}^+/I_{out}^-$ and differential input signals $V_{in}^+/V_{in}^-$ is defined by the delays selected for the variable optical delay components $405_1^+$, $405_2^+$ ... $405_N^+$, $405_1^-$, $405_2^-$ ... $405_N^-$, and the gain/attenuation levels selected for the variable amplifiers/attenuators $455_1^+$, $455_2^+$ ... $455_N^+$, $455_1^-$, $455_2^-$ ... $455_N$. For example, such delays and gain/attenuation levels may be selected to filter out from signals $V_{in}^+/V_{in}^-$ undesirable frequency components so that output current signals $I_{out}^+/I_{out}^-$ are substantially free or have substantially reduced levels of the undesirable frequency components. Although exemplary embodiment 400 is shown as including a multitude of delay and gain/attenuation components in the delay paths thereby to form an IFR filter, it is understood that other embodiments may include different optical components to filter, shape signals $V_{in}^+$ and $V_{in}^-$.

Figure 5:
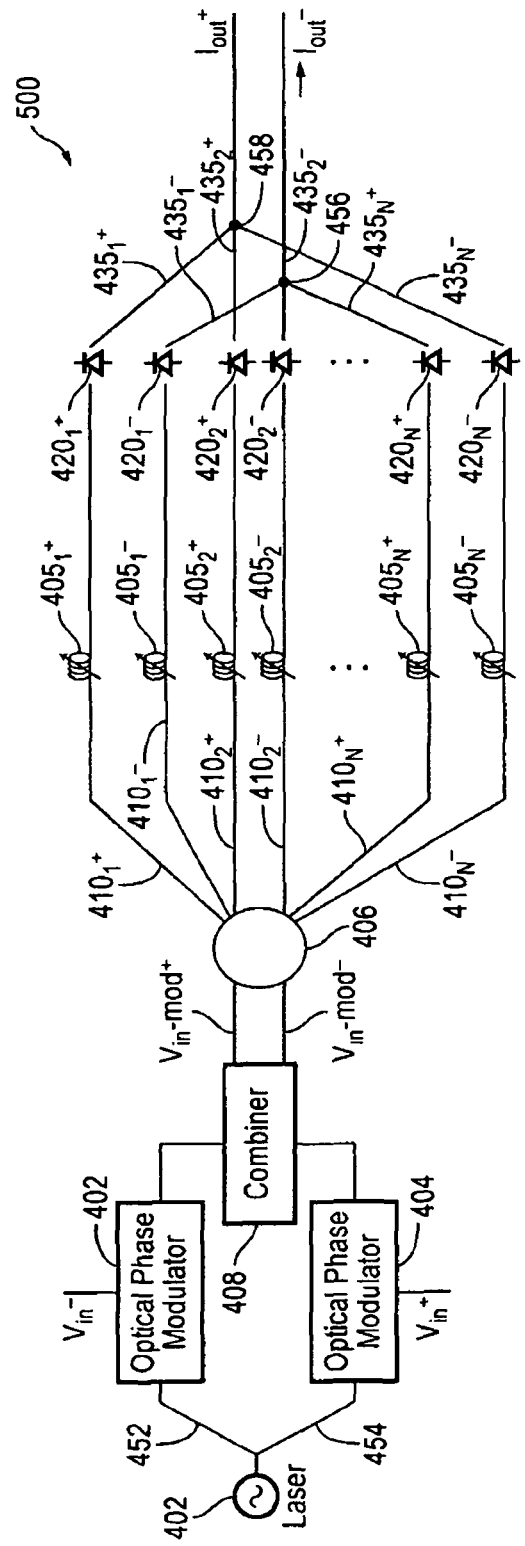
FIG. 5 is a simplified block diagram of an integrated electro-optical signal processing circuit, in accordance with one embodiment of the present invention.

FIG. 5 is a simplified block diagram of an electro-optical signal processing circuit 500, in accordance with another embodiment of the present invention. Circuit 500 is similar to circuit 400 except that circuit 500 does not have any gain/attenuation components in its signal processing paths.

The above embodiments of the present invention are illustrative and not limitative. The invention is not limited by the type of optical phase modulator, signal splitter, signal combiner, optical delay component, optical gain/attenuator, or photo-diode. The invention is not limited by the frequency or bandwidth of the optical signal modulated by the electrical signal. The invention is not limited by the number of paths into which the optical signal is split. The invention is not limited by the type of integrated circuit in which the present invention may be disposed. Nor is the invention limited to any specific type of process technology, e.g., CMOS, Bipolar, or BICMOS that may be used to manufacture the embodiments of the present invention. Other additions, subtractions or modifications are obvious in view of the present invention and are intended to fall within the scope of the appended claims.

What is claimed is:

1. An electro-optical circuit comprising:
    an optical modulator adapted to modulate an optical signal using an electrical input signal;
    a splitter adapted to split the modulated optical signal into N optical signals;
    N paths each having disposed therein at least one optical signal processing component adapted to receive and process a different one of the N optical signals;
    N photo-diodes each associated with a different one of the at least N optical signal processing components and adapted to convert an optical signal received from an associated optical signal processing component to a current signal; and
    a signal combiner adapted to combine the N current signals received from the N photo-diodes to generate an output current signal, said optical modulator not being responsive to the output current signal.

2. The electro-optical circuit of claim 1 wherein said at least one optical signal processing component disposed in at least a first subset of the N paths is a variable optical delay component.

3. The electro-optical circuit of claim 2 wherein each of the N optical paths further comprises at least a second optical signal processing component.

4. The electro-optical circuit of claim 3 wherein said at least second optical signal processing component disposed in at least a second subset of the N paths is a variable optical gain/attenuation component.

5. The electro-optical circuit of claim 4 wherein said second subset is a same as the first subset.

6. The electro-optical circuit of claim 2 wherein the variable delay component disposed in each of the first subset of the N paths is selected from a group consisting of a waveguide, an optical switch, a p-n junction, or a ring resonator.

7. The electro-optical circuit of claim 4 wherein the delays associated with the variable optical delay components disposed in the first subset of N paths and the gain/attenuation values associated with the variable optical gain/attenuation components disposed in the second subset of N paths are selected so as to cause the output current signal represent a filtered version of the input electrical signal.

8. The electro-optical circuit of claim 7 wherein said electrical input signal is a voltage signal.

9. An electro-optical circuit comprising:
a pair of optical modulators each adapted to modulate an optical signal using a different one of a pair of differential electrical input signals;
a splitter adapted to split the modulated optical signals into a first N differential optical signals and a second N differential optical signals;
a first N paths each having disposed therein at least one optical signal processing component adapted to receive and process a different one of the first N differential optical signals;
a second N paths each having disposed therein at least one optical signal processing component adapted to receive and process a different one of the second N differential optical signals;
a first N photo-diodes each associated with a different one of the first N optical signal processing components and adapted to convert an optical signal received from the associated optical signal processing component to a current signal;
a second N photo-diodes each associated with a different one of the second N optical signal processing components and adapted to convert an optical signal received from the associated optical signal processing component to a current signal;
a first signal combiner adapted to combine the N current signals received from the first N photo-diodes to generate a differentially positive output current signal; and
a second signal combiner adapted to combine the N current signals received from the second N photo-diodes to generate a differentially negative output current signal.

10. The electro-optical circuit of claim 9 wherein the at least one optical signal processing component disposed in at least a first subset of the first and second N paths is a variable optical delay component.

11. The electro-optical circuit of claim 10 wherein each of the first and second N optical paths further comprises at least a second optical signal processing component.

12. The electro-optical circuit of claim 11 wherein the at least second optical signal processing component disposed in at least a second subset of the first and second N paths is a variable optical gain/attenuation component.

13. The electro-optical circuit of claim 12 wherein said second subset is a same as the first subset.

14. The electro-optical circuit of claim 10 wherein the variable delay component disposed in each of the first subset of the first and second N paths is selected from a group consisting of a waveguide, an optical switch, a p-n junction, or a ring resonator.

15. The electro-optical circuit of claim 12 wherein the delays associated with the variable optical delay components disposed in the first subset of the first and second N paths and the gain/attenuation values associated with the variable optical gain/attenuation components disposed in the second subset of the first and second N paths are selected so as to cause the output current signal represent a filtered version of the input electrical signal.

16. The electro-optical circuit of claim 15 wherein said differential electrical input signals is a pair of differential voltage signals.

17. A method of processing an input electrical signal comprising:
modulating an optical signal using the input electrical signal;
splitting the modulated optical signal into N optical signals;
processing each of the N optical signals in N different paths to generate N optically processed signals;
converting each of the N optically processed signals to a current signal; and
combining the N current signals to generate an output current signal, said modulation not being responsive to the output current signal.

18. The method of claim 17 wherein the processing of a first subset of the N optical signals comprises delaying the optical signals of the first subset of the N optical signals.

19. The method of claim 18 wherein the processing of a second subset of the N optical signals further comprises varying the gain/attenuation values of the second subset of the N optical signals.

20. The method of claim 19 wherein the second subset is a same as the first subset.

21. The method of claim 18 wherein delaying the of the first subset of the N optical signals is performed via a variable delay component selected from a group consisting of a waveguide, an optical switch, a p-n junction, or a ring resonator.

22. The method of 19 wherein the delays of the first subset of N optical signals and the gain/attenuation level of the second subset of the N signals are selected so as to cause the output current signal represent a filtered version of the input electrical signal.

23. The method of claim 22 wherein said input electrical signal is a voltage signal.

24. A method of processing a differential pair of input electrical signals, the method comprising:
modulating an optical signal using the differential pair of electrical input signals;
splitting the modulated optical signals into first N differential optical signals and a second N differential optical signals;
processing the first N optical signals in a first group of N paths to generate a first group of N optically processed signals;
processing the second N optical signals in a second group of N paths to generate a second group of N optically processed signals;
converting each of the first group of N optically processed signals to a first group of N current signals;
converting each of the second group of N optically processed signals to a second group of N current signals;
combining the first group of N current signals to generate a differentially positive output current signal; and
combining the second group of N current signals to generate a differentially negative output current signal.

25. The method of claim 24 wherein the processing of a first subset of the first and second groups of N optical signals comprises delaying the optical signals of the first subset.

26. The method of claim 25 wherein the processing of a second subset of the first and second groups of N optical signals comprises amplifying/attenuating the second subset.

27. The method of claim 26 wherein the second subset is a same as the first subset.

28. The method of claim 25 wherein the delaying the optical signals of the first subset is performed via a variable delay component selected from a group consisting of a waveguide, an optical switch, a p-n junction, or a ring resonator.

29. The method of claim 25 wherein the delay values of the optical signals of the first subset and the gain/attenuation values of the optical signals of the second subset are selected so as to cause the differentially positive and negative output current signals represent a filtered version of the differential pair of input electrical signals.

30. The method of claim 24 wherein said differential electrical input signals is a pair of differential voltage signals.

\* \* \* \* \*